(12) United States Patent
Parappalliyalil et al.

(10) Patent No.: US 12,407,645 B2
(45) Date of Patent: *Sep. 2, 2025

(54) SYSTEMS AND METHODS OF DATABASE INSTANCE CONTAINER DEPLOYMENT

(71) Applicant: Walmart Apollo, LLC, Bentonville, AR (US)

(72) Inventors: Jayakrishnan Parappalliyalil, Cupertino, CA (US); Kavindra Yerolkar, Foster City, CA (US); Aniruddha Mondal, San Francisco, CA (US); Preetish Kumar Tripathi, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/866,902

(22) Filed: Jul. 18, 2022

(65) Prior Publication Data

US 2022/0353237 A1 Nov. 3, 2022

Related U.S. Application Data

(63) Continuation of application No. 15/166,985, filed on May 27, 2016, now Pat. No. 11,394,685.

(51) Int. Cl.
*H04L 61/5007* (2022.01)
*G06F 16/21* (2019.01)
(Continued)

(52) U.S. Cl.
CPC .......... *H04L 61/5007* (2022.05); *G06F 16/21* (2019.01); *G06F 16/27* (2019.01); *H04L 61/5061* (2022.05); *H04L 67/1097* (2013.01)

(58) Field of Classification Search
CPC ............. H04L 61/5007; H04L 61/5061; H04L 67/1097; G06F 16/21; G06F 16/27
See application file for complete search history.

(56) References Cited

U.S. PATENT DOCUMENTS 9,256,467 B1 * 2/2016 Singh ................... G06F 9/5077
2008/0056120 A1 * 3/2008 Jha ...................... H04L 12/4641
370/216

(Continued)

*Primary Examiner* — Sanjiv Shah
*Assistant Examiner* — Faezeh Forouharnejad
(74) *Attorney, Agent, or Firm* — DICKINSON WRIGHT RLLP; Hector A. Agdeppa

(57) ABSTRACT

Systems and methods can include one or more processing modules and one or more non-transitory storage modules storing computing instructions configured to run on the one or more processing modules and perform acts. The acts an include providing a bonded network interface on a host server, where the host server can include a plurality of internet protocol (IP) addresses. The acts also can include binding a first database instance container to a first IP address of the plurality of IP addresses of the host server such that a first database deployed inside the first database instance container has direct access to the host server. Systems and methods also can include deploying a first database instance container of a first cluster at a first host server and deploying a second database instance container of a second cluster at the first host server. Other embodiments also are disclosed herein.

20 Claims, 6 Drawing Sheets

(51) Int. Cl.
*G06F 16/27* (2019.01)
*H04L 61/5061* (2022.01)
*H04L 67/1097* (2022.01)

(56) References Cited

U.S. PATENT DOCUMENTS

| | | | |
|---|---|---|---|
| 2013/0151680 A1* | 6/2013 | Salinas | G06F 16/211 |
| | | | 709/223 |
| 2016/0205519 A1* | 7/2016 | Patel | H04W 4/10 |
| | | | 455/518 |
| 2016/0299800 A1 | 10/2016 | Cleary et al. | |
| 2016/0330138 A1 | 11/2016 | Thomason | |
| 2017/0170990 A1 | 6/2017 | Gaddehosur et al. | |
| 2017/0317969 A1* | 11/2017 | Masurekar | H04L 61/5014 |

* cited by examiner

SYSTEMS AND METHODS OF DATABASE INSTANCE CONTAINER DEPLOYMENT

CROSS-REFERENCE TO RELATED APPLICATIONS

This application is a continuation of U.S. application Ser. No. 15/166,985 filed May 27, 2016, to be issued as U.S. Pat. No. 11,394,685. U.S. application Ser. No. 15/166,985 is incorporated herein by reference in its entirety.

TECHNICAL FIELD

This disclosure relates generally to container deployment, and relates more particularly to database instance container deployment.

BACKGROUND

Conventional systems require a single hardware device for each application/database deployment. However, the nature of application workload is highly variable, resulting in an impedance mismatch between application workloads and hardware. This mismatch causes suboptimal resource utilization and unused capacity within clusters.

BRIEF DESCRIPTION OF THE DRAWINGS

To facilitate further description of the embodiments, the following drawings are provided in which.

Figure 1:
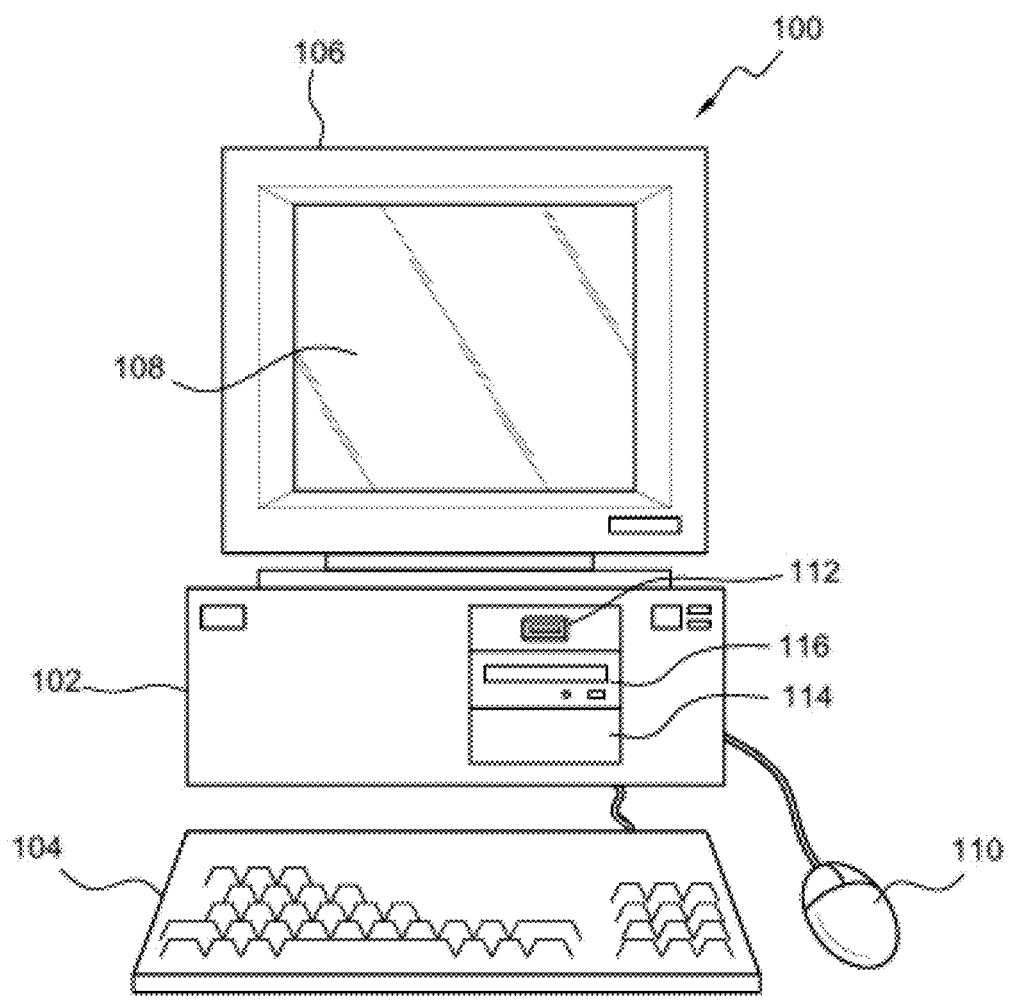
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules and perform acts. The acts can include deploying a first database instance container at a first host server, the first database instance container belonging to a first cluster. The acts also can include deploying a second database instance container at a second host server, the second database instance container belonging to the first cluster. The acts can further include deploying a third database instance container at the first host server, the third database instance container belonging to the first cluster. The acts can additionally include deploying a fourth database instance container at the second host server, the fourth database instance container belonging to the second cluster.

A number of embodiments can include a system. The system can include one or more processing modules and one or more non-transitory storage modules storing computing instructions configured to run on the one or more processing modules and perform acts. The acts can include creating a bonded network interface on a host server, the host server comprising a plurality of internet protocol (IP) addresses.

The acts also can include binding a first database instance container to a first IP address of the plurality of IP addresses of the host server such that a first database deployed inside the first database instance container has direct access to the host server.

Various embodiments include a method. The method can include allocating a first pool of a first plurality of internet protocol (IP) addresses to a first host server. The method also can include allocating a second pool of a second plurality of IP addresses to a second server, wherein the first plurality of IP addresses are different from and non-overlapping with the second plurality of IP addresses. The method can further include creating a first bonded network interface at the first host server. The method can additionally include creating a second bonded network interface at the second host server. Moreover, the method can include binding a first database instance container to the first bonded network interface and also to a first IP address of the first pool of the first plurality of IP addresses such that a first database deployed inside the first database instance container has direct access to the first host server. The method also can include binding a second database instance container to the second bonded network interface and also to a second IP address of the second pool of the second plurality of IP addresses such that a second database inside the second database instance container has direct access to the second host server.

A number of embodiments include a system including one or more processors and one or more non-transitory computer-readable media storing computing instructions that, when executed on the one or more processors, cause the one or more processors to perform certain acts. The acts can include providing a bonded network interface on a host server, the host server comprising a plurality of internet protocol (IP) addresses. The acts also can include binding a first database instance container to a first IP address of the plurality of IP addresses of the host server. The first database instance container can belong to a first cluster. The acts further can include binding a second database instance container to a second IP address of the plurality of IP addresses of the host server. The second database instance container can belong to a second cluster that is different from and non-overlapping with the first cluster. The first cluster can include a different fault tolerance than the second cluster.

Several embodiments can include a method being implemented via execution of computing instructions configured to run on one or more processors and stored at one or more non-transitory computer-readable media. The method can include providing a bonded network interface on a host server, the host server comprising a plurality of internet protocol (IP) addresses. The method also can include binding a first database instance container to a first IP address of the plurality of IP addresses of the host server. The first database instance container can belong to a first cluster. The method further can include binding a second database instance container to a second IP address of the plurality of IP addresses of the host server. The second database instance container can belong to a second cluster that is different from and non-overlapping with the first cluster. The first cluster can include a different fault tolerance than the second cluster.

Figure 2:
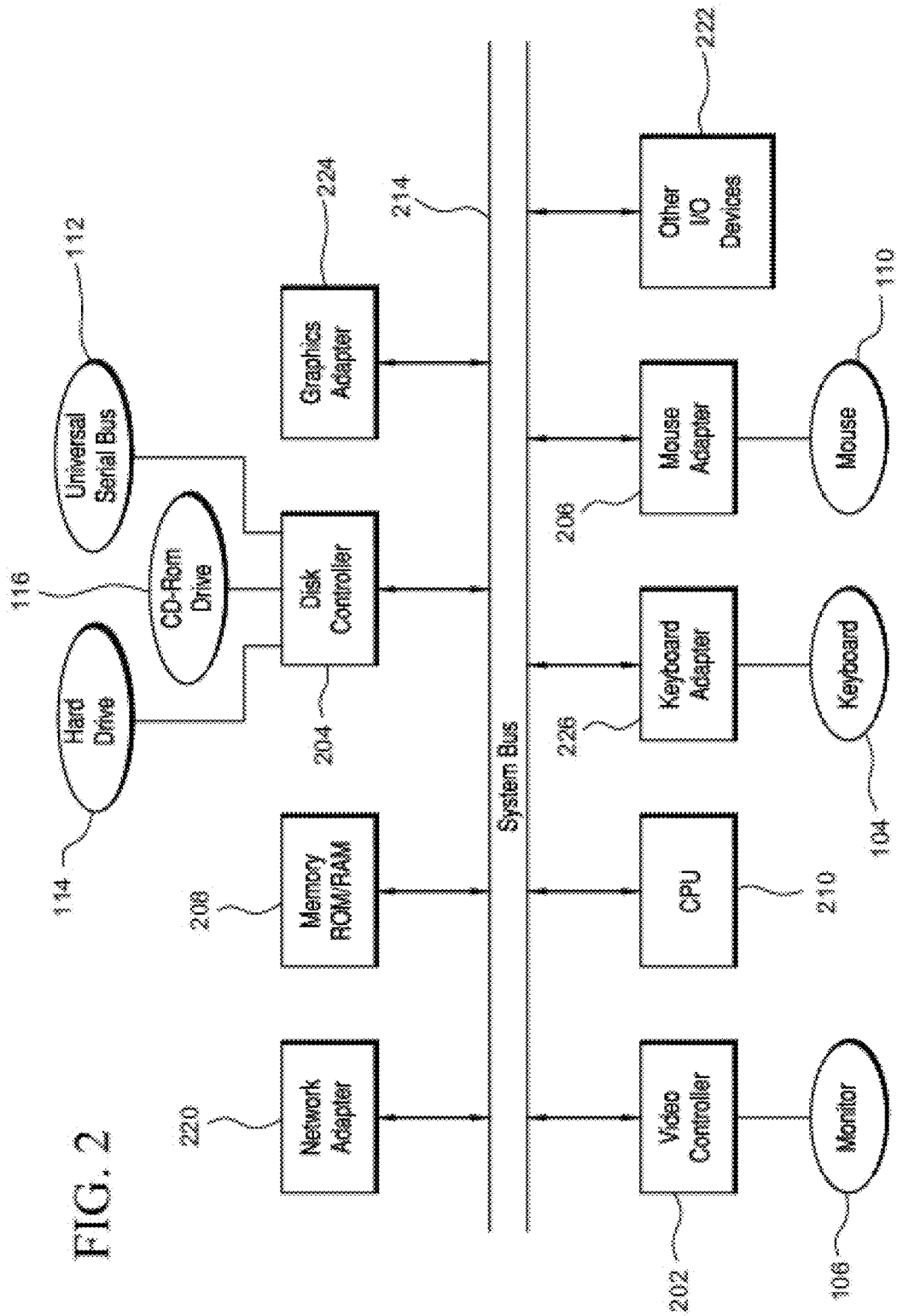
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) also can be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210. In some examples, the systems and procedures described herein are implemented in hardware, or a combination of hardware, software, and/or firmware. For example, one or more application specific integrated circuits (ASICs) can be programmed to carry out one or more of the systems and methods described herein.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
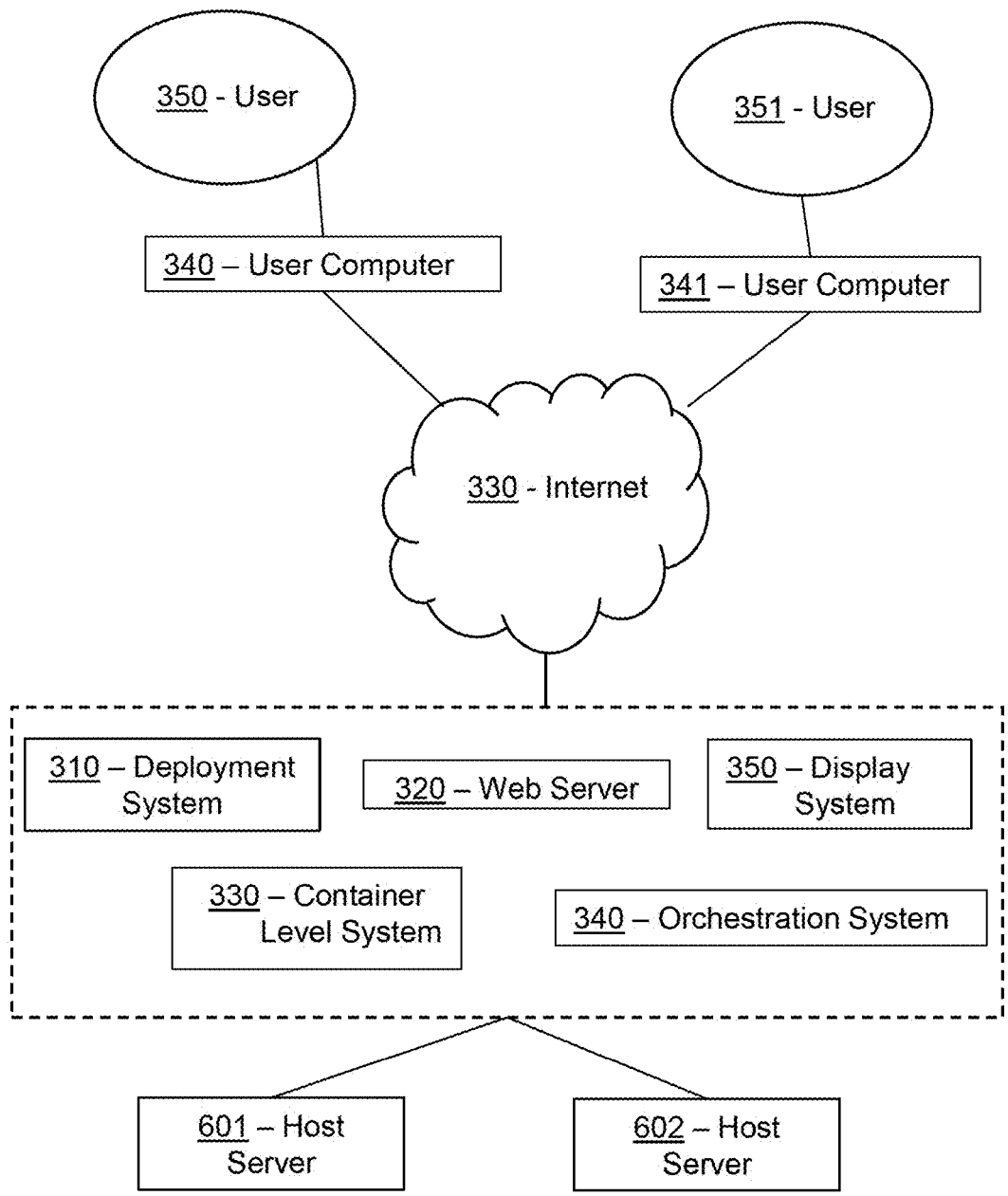
FIG. 3 illustrates a representative block diagram of a system, according to an embodiment.

Turning ahead in the drawings, FIG. 3 illustrates a block diagram of a system 300 that can be employed for database instance container deployment. System 300 is merely exemplary and embodiments of the system are not limited to the embodiments presented herein. The system can be employed in many different embodiments or examples not specifically depicted or described herein. In some embodiments, certain elements or modules of system 300 can perform various procedures, processes, and/or activities. In other embodiments, the procedures, processes, and/or activities can be performed by other suitable elements or modules of system 300.

In some embodiments, system 300 can include a deployment system 310, a web server 320, a container level system 330, an orchestration system 340, and/or a display system 350. Deployment system 310, web server 320, container level system 330, orchestration system 340, and display system 350 can each be a computer system, such as computer system 100 (FIG. 1), as described above, and can each be a single computer, a single server, or a cluster or collection of computers or servers, or a cloud of computers or servers. Additional details regarding deployment system 310, web server 320, container level system 330, orchestration system 340, and display system 350 are described herein.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. In other embodiments, user computers 340-341 can be administrator computers.

In many embodiments, deployment system 310, web server 320, container level system 330, orchestration system 340, and/or display system 350 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of deployment system 310, web server 320, container level system 330, orchestration system 340, and/or display system 350 in a wired manner and/or a wireless manner, and the coupling can be direct and/or indirect, as well as locally and/or remotely. As an example of an indirect manner (which also may or may not be a remote manner), a keyboard-video-mouse (KVM) switch can be used to couple the input device(s) and the display device(s) to the processing module(s) and/or the memory storage module(s). In some embodiments, the KVM switch also can be part of deployment system 310, web server 320, container level system 330, orchestration system 340, and/or display system 350. In a similar manner, the processing module(s) and the memory storage module(s) can be local and/or remote to each other.

In many embodiments, to deployment system 310, web server 320, container level system 330, orchestration system 340, and display system 350 can be configured to communicate with one or more user computers 340 and 341. In some embodiments, user computers 340 and 341 also can be referred to as customer computers and/or administrator computers. In some embodiments, deployment system 310, web server 320, container level system 330, orchestration system 340, and/or display system 350 can communicate or interface (e.g. interact) with one or more user computers (such as user computers 340 and 341) through a network or internet 330. Internet 330 can be an intranet that is not open to the public. Accordingly, in many embodiments, deployment system 310, web server 320, container level system 330, orchestration system 340, and display system 350 (and/or the software used by such systems) can represent at least a portion of a back end of system 300 operated by an operator and/or administrator of system 300, and user computers 340 and 341 (and/or the software used by such systems) can refer to a front end of system 300 used by one or more customers 350 and 351, respectively. In some embodiments, customers 350 and 351 also can be referred to as users. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, deployment system 310, web server 320, container level system 330, orchestration system 340, and display system 350 also can be configured to communicate with one or more databases and one or more host servers 601, 602. In some embodiments, host servers 601, 602 also can be part of a back end of system 300. The one or more databases can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between deployment system 310, web server 320, container level system 330, orchestration system 340, and/or display system 350, the one or more host servers 601, 602, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
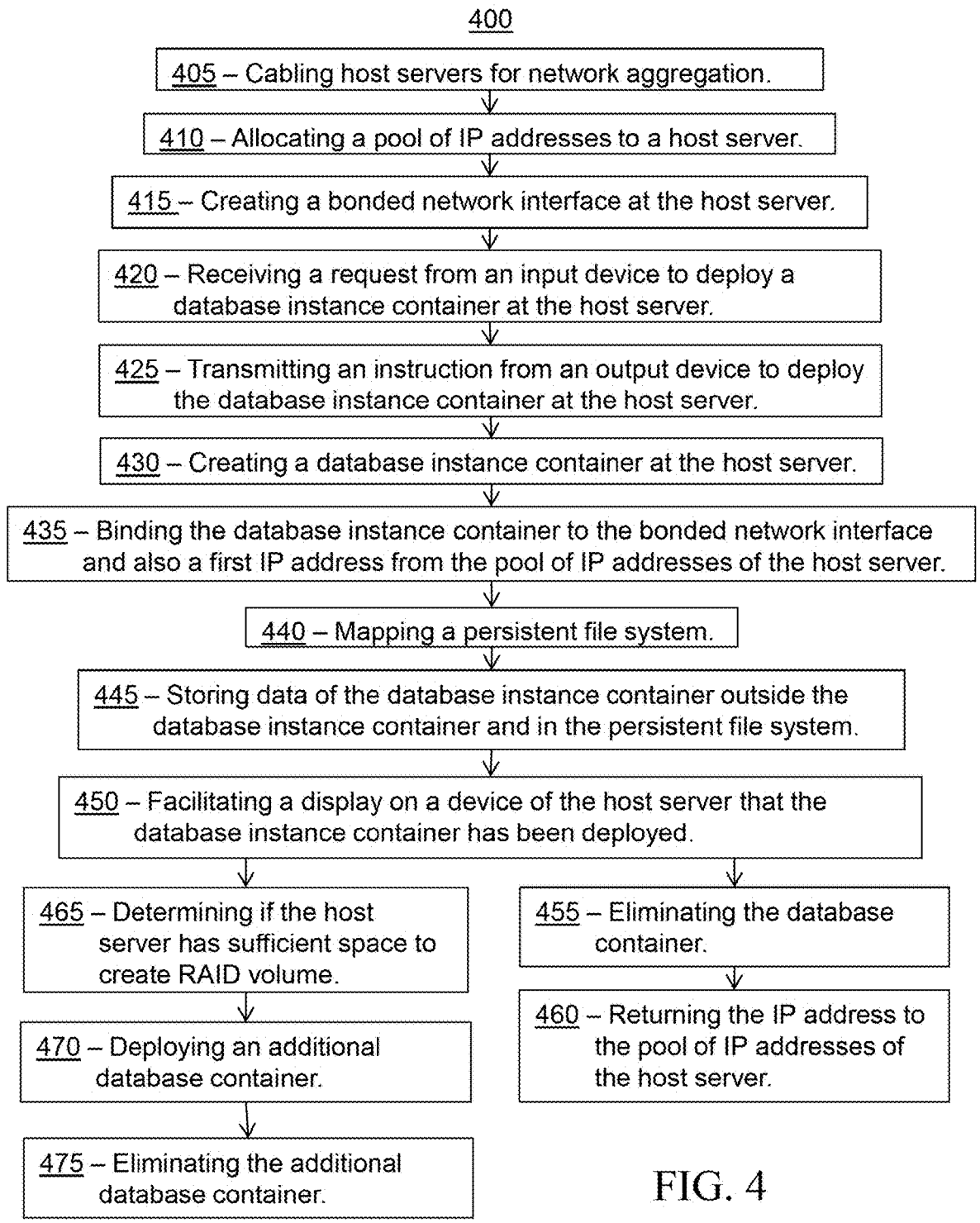
FIG. 4 is a flowchart of a method, according to an embodiment.
Figure 5:
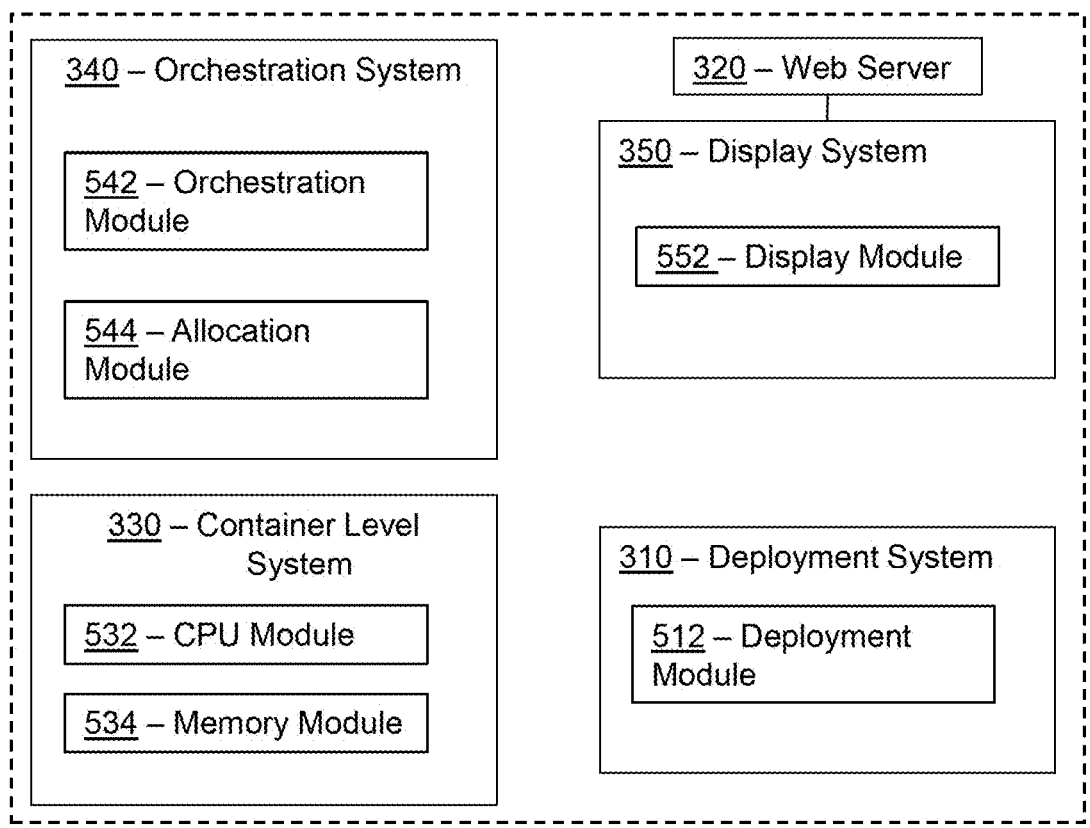
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules, such as modules 512, 532, 534, 542, 544, 552 (FIG. 5). Such non-transitory memory storage modules can be part of a computer system such as deployment system 310 (FIGS. 3 & 5), container level system 330 (FIGS. 3 & 5), orchestration system 340 (FIGS. 3 & 5), and/or display system 350. The processing module(s) can be similar or identical to the processing module(s) described above with respect to computer system 100 (FIG. 1).

Method 400 can comprise an activity 405 of cabling a plurality of host servers for network aggregation. For example, host servers 601, 602 (FIGS. 5 & 6) can be cabled for network aggregation. Other embodiments contemplated herein may comprise any number of a plurality of host servers or, alternatively, a single host server. In many embodiments, host servers can include the necessary specifications to support running multiple containers and application instances at the respective host server. In some embodiments, the plurality of host servers can comprise a server farm created from a plurality of racks. In some embodiments, the host network of the plurality of host servers is designed with leaf-spine network topology.

Figure 6:
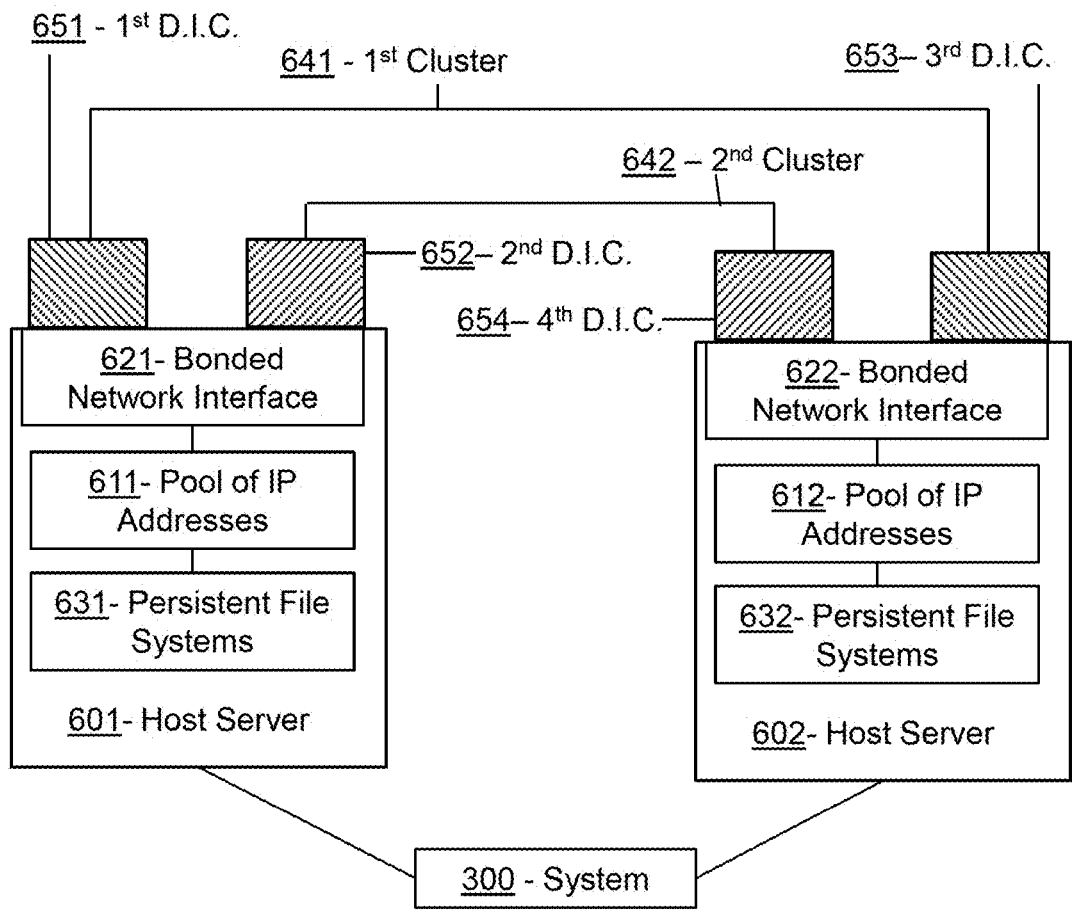
FIG. 6 illustrates a representative block diagram of database instance containers deployed on two different host servers.

Method 400 also can comprise an activity 410 of allocating a pool of internet protocol (IP) addresses to each host server. More particularly, using FIG. 6 as an example, a method can comprise allocating a first pool 611 of a first plurality of IP addresses to a first host server 601, and allocating a second pool 612 of a second plurality of IP addresses to a second server 602. For example, the non-limiting block diagram of FIG. 6 shows a system 600 having a first server 601, which comprises a first pool 611 of IP addresses, and also having a second server 602, which comprises a second pool 612 of IP addresses. In some embodiments, the first plurality of IP addresses in the first pool 611 at the first server 601 are different from and non-overlapping with the second plurality of IP addresses of the second pool 612 at the second server 602. In some embodiments, each host server is allocated with at least two IP addresses in the pool of IP addresses. The pool of IP addresses can comprise a pool of physical IP addresses and/or a pool of routable IP addresses. In some embodiments comprising a pool of routable IP addresses, there is no virtual network layer on the host server that is responsible to direct server traffic. IP addresses can be assigned directly to the bonded network interface or to multiple aliases created on the server.

Returning to FIG. 4, method 400 can further comprise an activity 415 of creating a bonded network interface at a host server. More particularly, using FIG. 6 as an example, a method can comprise activities of creating a first bonded network interface 621 at the first host server 601 and creating a second bonded network interface 622 at the second host server 602. For example, the non-limiting block diagram of FIG. 6 shows a first bonded network interface 621 created at the first host server 601 and a second bonded network interface 622 created at the second host server 602. Thus, in some embodiments, a first host server of a server network can comprise a bonded network interface and a first plurality of internet protocol (IP) addresses in a first pool of IP addresses, and a second host server of the server network can comprise a bonded network interface and a second plurality of IP addresses in a second pool of plurality of IP addresses.

In some embodiments, creating the bonded network interface for the respective host server comprises aggregating a plurality of network interface controllers (NIC) available at the host server in active-active mode. For example, in active-active mode, all the network interfaces in a bonded network interface are actively servicing network traffic. Different embodiments can utilize different implementations of active mode, such as but not limited to a first active-active mode, a second active-active mode, a third active-active mode, a fourth active-active mode, a fifth active-active mode, a sixth active-active mode, and a seventh active-active mode. A first active-active mode can comprise a balanced round robin. For example, if there are three physical interfaces in the bonded network interface, the first frame will go out to the first interface of the bonded network interface, the second frame will go out to the second interface of the bonded network interface, and the third frame will go out to the third interface of the bonded network interface. In a second active-active mode, when an active interface face fails, the next active interface in line in the bonded network interface can be used for transmitting. In a third active-active mode, or XOR mode, the same active interface always can be selected for the same destination media access control (MAC) address. In a fourth active-active mode, or broadcast mode, everything can be transmitted to all active interfaces. In a fifth active-active mode, or dynamic link aggregation, the active interface can have the same link speed and duplex settings. Active interface selection in a fifth active-active mode can be done based on the hash policy or the XOR policy of the third active-active mode. A sixth active-active mode can be adaptive transmit load balancing, and can be done based on the present load on the active interfaces of the bonded network interface. The active interfaces under a lesser outgoing queue can be chosen. A seventh active-active mode can be similar to the sixth active-active mode, with the possible addition of receiving load balance. It is noted that various embodiments contemplated herein can utilize any of the described active-active modes. Furthermore, network bonding can require certain conditions to be met at the switch level. Thus, the switch to which the bonded network interface is coupled can support the specific active-active mode being utilized in the system.

In some embodiments, all of the available NICs at a host server may be aggregated to create the bonded network interface at that host server. More particularly, creating the first bonded network interface at the first host server can comprise creating the first bonded network interface by aggregating a plurality of network interface controllers available in the first host server when the first host server is in an active-active mode, and creating the second bonded network interface at the second host server can comprises creating the second bonded network interface by aggregating a plurality of network interface controllers available in the second host server when the second host server is in an active-active mode. By creating a bonded network interface with the host server in active-active mode, maximum network bandwidth for high throughput and availability on the host server is achieved. It is contemplated, however, that other modes also may be utilized in other embodiments, such as but not limited to aggregating a plurality of network interface controllers available in the host server when the host server is in an active-passive mode.

Returning back to FIG. 4, method 400 also can comprise an activity 420 of receiving a request from an input device to deploy or otherwise create a database instance container at a host server. In more particular embodiments, a method can comprise receiving a request from an input device to deploy one or more database instance containers at a first host server, and a request from the input device to deploy one or more of database instance containers at a second host server. For example, a method can comprise receiving a request from an input device to deploy one or more of a first database instance container and a third database instance container at a first host server, and receiving a request from the input device to deploy one or more of a second database instance container and a fourth database instance container at a second host server. In some embodiments, the input device can determine whether the first host server and the second host server are in the same or separate fault zones. The input device can be one of the input devices of the system 300 (FIG. 3) or one of user computers 340, 341 (FIG. 3). In some embodiments, using FIG. 5 as an example, deployment module 512 of deployment system 310 of system 300 receives a request from an input device to deploy or otherwise create a database instance container at a host server. In other embodiments, any other modules 532, 534, 542, 544, 552 of system 300 can receive a request from an input device to deploy or otherwise create a database instance container at a host server.

Referring to FIG. 4, again, method 400 also can comprise an activity 425 of transmitting an instruction from an output device to deploy or otherwise create a database instance container at a host server. In more particular embodiments, a method can comprise transmitting an instruction from an output device to deploy one or more database instance containers at a first host server on a host server network responsive to the request from the input device, and transmitting an instruction from the output device to deploy one or more database instance containers at a second host server network responsive to the request from the input device. For example, a method can comprise transmitting an instruction from an output device to deploy the one or more of the first database instance container and the third database instance container at the first host server responsive to the request from the input device, and transmitting an instruction from the output device to deploy the one or more of the second database instance container and the fourth database instance container at the second host server responsive to the request from the input device. The output device can be one of the output devices of the system 300 (FIG. 3) or user computers 340, 341 (FIG. 3). In some embodiments, using FIG. 5 as an example, deployment module 512 of deployment system 310 of system 300 is configured to transmit instructions to the output device to deploy or otherwise create a database instance container at a host server of a host server network. In other embodiments, any other modules 532, 534, 542, 544, 552 of system 300 can transmit instructions to the output device to deploy or otherwise create a database instance container at a host server of a host server network.

Referring back to FIG. 4, method 400 can further comprise an activity 430 of creating a database instance container at the host server. As used herein, a database instance container can comprise an application instance container. As such, a database instance container can comprise an application or database deployed within a container on a host server. In more particular embodiments, a method can comprise an activity of creating a plurality of database instance containers at a first host server of a host server network and a plurality of database instance containers at a second host server of the host server network. In some embodiments, creating the database instance container at a host server comprises installing a database on the first host server, and then creating a container at the first host server by using one IP address from the pool of IP addresses of the host server to create a network alias on the bonded network interface at the host server. A routable IP address from the pool of IP addresses can be assigned to the network alias. After the container is created, an installation path of the database can be mapped to a directory inside the container such that the database can then be started inside the container. In particular embodiments comprising a plurality of host servers, a method can comprise creating the first database instance container at the first host server by using one IP address from the first pool of the first plurality of IP addresses of the first host server to create a first virtual IP address on the first bonded network interface at the first host server, and creating the second database instance container at the second host server by using one IP address from the second pool of the second plurality of IP addresses of the second host server to create a second virtual IP address on the second bonded network interface at the second host server.

Turning to FIG. 5, in some embodiments, deployment module 512 of deployment system 310 of system 300 creates a database instance container at the host server. In other embodiments, any other modules 532, 534, 542, 544, 552 of system 300 can create a database instance container at the host server. In some embodiments, database instance containers can be deployed using Dockers or other container services. In some embodiments, systems and methods can comprise virtual network interface on top of the bonded network interface for every database instance container. The virtual IP addresses can belong to the same virtual local area network (VLAN) or a different VLAN depending upon the desired security requirements. Each database instance container created can be created with predetermined required system resources, such as but not limited to CPU and memory.

In some embodiments, creating a database instance container at a host server can comprise creating a database instance container belonging to a cluster at a host server. In more particular embodiments, multiple database instance containers created or otherwise deployed at a host server may belong to different and non-overlapping clusters. For example, a method can comprise deploying a first database instance container at a first host server, the first database instance container belonging to a first cluster, deploying a second database instance container at a second host server, the second database instance container belonging to the first cluster, deploying a third database instance container at the first host server, the third database instance container belonging to the first cluster, and deploying a fourth database instance container at the second host server, the fourth database instance container belonging to the second cluster. The first cluster and the second cluster of such embodiments can be different from and non-overlapping with one another. The non-limiting block diagram of FIG. 6 shows, by way of example, a first database instance container (D.I.C.) 651 of a first cluster 641 at a first host server 601, a second database instance container 652 of a second cluster 642 at the first host server 601, a third database instance container 653 of the first cluster 641 at a second host server 602, and a fourth database instance container 654 of the second cluster 642 at the second host server 602.

By distributing database instance containers of a cluster to different host servers, system performance is improved in case of a crash or other hardware malfunction of the host server. Some embodiments can be designed to be rack or fault domain aware. Thus, clusters can be created with nodes or database instance containers in different fault tolerant zones. If a host server or other hardware has a malfunction, then the malfunction results in only the loss of the database instance container running on the host server or hardware, and does not result in the loss of the entire cluster. Moreover, by deploying multiple database instance containers on a single host server, the capacity for database instances can be doubled (or more), thereby saving costs for the administrator.

Returning to FIG. 4, method 400 can further comprise an activity 435 of binding the database instance container to the bonded network interface and also a first IP address from the pool of IP addresses of the host server. Thus, the database deployed inside the container has direct access to the host level system, storage, and network resources. In some embodiments, binding the database instance container to the IP address of the host server comprises binding the database instance container to a physical IP address of the host server. More particularly, a method can comprise binding the database instance container to a bonded network interface and also to a first IP address of the pool of IP addresses of the host server of the host server network such that a database deployed inside the database instance container has direct access to the host server. In embodiments comprising a plurality of host servers and database instance containers, a method can comprise the activities of binding a first database instance container to the first bonded network interface and also to a first IP address of the first pool of the first plurality of IP addresses of the first host server such that a first database deployed inside the first database instance container has direct access to the first host server, and binding a second database instance container to the second bonded network interface and also to a second IP address of the second pool of the second plurality of IP addresses of the second host server such that a second database inside the second database instance container has direct access to the second host server.

Deployment of database instance container by binding the database instance container to a bonded network interface and also an IP address of the host server is advantageous because this deployment enables the database deployed within the database instance container to have direct access to the system resources and avoid any resource virtualization. Referring to FIG. 5, in some embodiments, deployment module 512 of deployment system 310 of system 300 binds the database instance container to the bonded network interface and also to a first IP address from the pool of IP addresses of the host server. In other embodiments, any other modules 532, 534, 542, 544, 552 of system 300 can bind the database instance container to the bonded network interface and also to a first IP address from the pool of IP addresses of the host server. In some embodiments, each IP address bound to a database instance container can be assigned with an addressable hostname and/or public name.

In some embodiments, binding the database instance container to an IP address from the pool of IP addresses of the host server can comprise allocating the IP address from the pool of IP addresses of the host server to a database instance container. In more particular embodiments, allocation of the IP address from the pool of IP addresses of the host server can be automatic or otherwise automated. For example, a method can comprise automatically allocating a first IP address of the first host server to the first database instance container, automatically allocating a second IP address of the second host server to the second database instance container, automatically allocating a third IP address of the first host server to the third database instance container, automatically allocating a fourth IP address of the second host server to the fourth database instance container, and automatically allocating an additional IP address of either one of the first host server or the second host server to an additional database instance container for binding to the respective host server. In some embodiments, allocation module 544 of orchestration system 340 is configured to automatically allocate an IP address of a host server to a database instance container. In other embodiments, any other modules 532, 534, 542, 544, 552 of system 300 can automatically allocate the IP address from the pool of IP addresses of the host server to a database instance container. In some embodiments, automatic allocation of an IP address of a pool of IP addresses can be based up on the availability of the IP addresses in the pool of the IP addresses of the particular host server. Orchestration tools developed using products such as Chef, Jenkins, Github, and Rundeck can be utilized to automate deployment of database instance containers.

As referenced above, some embodiments can comprise a plurality of clusters, a plurality of database containers, and a plurality of host servers. In these and other embodiments, binding the database instance container to an IP address from the pool of IP addresses of the host server can comprise binding the first database instance container of the first cluster to a first IP address of the first plurality of IP addresses of the first host server such that a first database deployed inside the first database instance container has direct access to the first host server, binding the second database instance container of the first cluster to a second IP address of the second plurality of IP addresses of the second host server such that a second database deployed inside the second database instance container has direct access to the second host server, binding the third database instance container of the second cluster to a third IP address of the first plurality of IP addresses of the first host server such that a third database deployed inside the third database instance container has direct access to the first host server, and binding the fourth database instance container of the second cluster to a fourth IP address of the second plurality of IP addresses of the second host server such that a fourth database deployed inside the fourth database instance container has direct access to the second host server.

Continuing with FIG. 4, method 400 can further comprise an activity of limiting an amount of a central processing unit (CPU) allocated to each database instance container. For example, a method can comprise limiting one or more different or same amounts of a CPU of the system allocated to each of the first, second, third, and fourth database instance containers. When creating a container on the host server, the container instance is allocated a specific number of CPU cores. If the container malfunctions and consumes excessive amounts of CPU capacity, the container could never consume more than what is allocated to the container. Referring to FIG. 5, in some embodiments, a CPU module 532 of the container level system 330 is configured to limit an amount of a CPU allocated to each database instance container. In other embodiments, any other modules 512, 534, 542, 544, 552 of system 300 can be configured to limit an amount of a CPU allocated to each database instance container.

Method 400 of FIG. 4 can further comprise an activity of guaranteeing an amount of a CPU allocated to each database instance container. For example, a method can comprise an activity of guaranteeing one or more different or same amounts of the CPU of the system allocated to each of the first, second, third, and fourth database instance containers. Referring to FIG. 5, in some embodiments, a CPU module 532 of the container level system 330 is configured to guarantee an amount of a CPU allocated to each database instance container. In other embodiments, any other modules 512, 534, 542, 544, 552 of system 300 can be configured to guarantee an amount of a CPU allocated to each database instance container.

Method 400 of FIG. 4 can further comprise an activity of limiting an amount of memory of the system allocated to each database instance container. For example, a method can comprise an activity of limiting one or more different or same amounts of memory of the system allocated to each of the first, second, third, and fourth database instance containers. Limiting the amount of memory allocated to each database instance container can be advantageous to the system. For example, a memory leak in the database running inside the container will not affect the other containers on the same host server by consuming all the system memory. Referring to FIG. 5, in some embodiments, a memory module 534 of the container level system 330 is configured to limit an amount of memory allocated to each database instance container. In other embodiments, any other modules 512, 532, 542, 544, 552 of system 300 can be configured to limit an amount of memory allocated to each database instance container.

Method 400 of FIG. 4 can further comprise an activity of guaranteeing an amount of memory of the system allocated to each database instance container. For example, a method can comprise guaranteeing one or more different or same amounts of the memory of the system allocated to each of the first, second, third, fourth database instance containers. Referring to FIG. 5, in some embodiments, a memory module 534 of the container level system 330 is configured to guarantee an amount of a memory allocated to each database instance container. In other embodiments, any other modules 512, 532, 542, 544, 552 of system 300 can be configured to guarantee an amount of a memory allocated to each database instance container.

Method 400 of FIG. 4 can further comprise an activity 440 of mapping a persistent file system. Mapping the persistent file system can comprise mapping a persistent file system for each host server to host level volumes. In some embodiments, each host server can comprise multiple file system partitions. In such embodiments, a full partition to a container can be mapped such that a container will be able to see all the files on the file system. Alternatively, different directories on a file system can be created, and a directory can be mapped to the container such that a container will be able to see all the files within that specific directory. In some embodiments, mapping a persistent file system for each host server to host level volumes can comprise mapping a directory structure inside the container such that a volume of the directory structure inside the container is mapped to a directory and/or partition outside the container. For example, a method can comprise an activity of mapping a first persistent file system of a first host server to a predetermined first host level volume, and mapping a second persistent file system of the second host server to a predetermined second host level volume. Referring to FIG. 5, in some embodiments, an orchestration module 542 of the orchestration system 340 is configured to map a persistent file system of each host server. In other embodiments, any other modules 512, 532, 534, 544, 552 of system 300 can be configured to map a persistent file system of each host server.

Method 400 of FIG. 4 can further comprise an activity 445 of storing data of a database instance container outside the database instance container and in the persistent file system. For example, a method can comprise storing application data of a first database instance container in a first persistent file system of a first host and outside the first database instance container, storing application data of a second database instance container in a second persistent file system of a second host server and outside the second database instance container, storing application data of a third database instance container in the first persistent file system of the first host and outside the third database instance container, and storing application data of a fourth database instance container in the second persistent file system of the second host server and outside the fourth database instance container. The non-limiting block diagram of FIG. 6 illustrates, by way of example, a first persistent file system 631 at a first host server 601 outside the database instance containers of the first host server 601, and a second persistent file system 632 at a second host server 602 outside the database instance containers of the second host server 602. Referring to FIG. 5, in some embodiments, an orchestration module 542 of the orchestrations system 340 is configured to store data of a database instance container outside the database instance container and in the persistent file system. In other embodiments, any other modules 512, 532, 534, 544, 552 of system 300 can be configured to store data of a database instance container outside the database instance container and in the persistent file system.

In some embodiments, storing data of a database instance container outside the database instance container and in the persistent file system comprises storing all data of the database instance container outside the database instance container and in the persistent file system. As used herein, all data references components of a particular database instance container deployment, the data files, the log files, and any other data that needs to be persisted. Storing data of the database instance container outside the database instance container and in a persistent file system is advantageous to virtual machines, which use ephemeral storage that is susceptible to data loss. Moreover, storing components of a particular database container deployment outside the database instance container is advantageous because any change to the specific deployment configuration of the database instance container does not warrant rebuilding of the container images.

Method 400 can further comprise an activity 450 of facilitating a display on a device of the host server at which the database instance container has been deployed. In some embodiments, a user interface communicates to an application programming interface (API) exposed on all the host servers to retrieve (a) information on the containers that each host server is running and (b) the specifications of the host server and the containers operating thereon. For example, a method can comprise activities of facilitating a display on a device of the first host server at which one or more of the first database instance container and the third database instance container has been deployed, and facilitating a display on a device of the second host server at which one or more of the second database instance container and the fourth database instance container has been deployed. In some embodiments, a display module 552 of the display system 550 is configured to facilitate a display on a device at the host server at which the database instance container has been deployed. In other embodiments, any other modules 512, 532, 534, 542, 544 of system 300 can be configured to facilitate a display on a device at the host server at which the database instance container has been deployed.

In some embodiments, method 400 also can comprise an activity of facilitating a display on a device of a user interface configured to capture requirements of a database instance container, monitor host servers and clusters, and allow a user or administrator to configure clusters, host servers, and database instance containers. Examining FIG. 5, in some embodiments, a display module 552 of the display system 550 is configured to facilitate a display on a device of a user interface. In other embodiments, any other modules 512, 532, 534, 542, 544 of system 300 can be configured to facilitate a display on a device of a user interface.

Returning to FIG. 4, method 400 also can comprise an activity 455 of eliminating or removing a database instance container from a host server. For example, a method can comprise eliminating at least one of the first database instance container or the second database instance container from a host server.

Upon elimination of a database instance container, method 400 can comprise activities 460 of deallocating an IP address from a database instance container and returning the IP address to the pool of IP addresses of the host server. In more particular embodiments, a method can comprise the activities of automatically deallocating a first IP address of the first host server to the first database instance container, automatically deallocating a second IP address of the second host server to the second database instance container, automatically deallocating a third IP address of the first host server to the third database instance container, automatically deallocating a fourth IP address of the second host server to the fourth database instance container, and automatically deallocating an additional IP address of either one of the first host server or the second host server from an additional database instance container at the respective host server. Upon deallocation of an IP address to a database instance container, the IP address may be returned to the pool of IP addresses of the host server to which the database instance container had previously been bound. For example, if a first database instance container is eliminated, a method can comprise returning the first IP address of the first database instance container to the first pool of the first plurality of IP addresses of the first host server, and if a second database instance container is eliminated, a method can comprise returning the second IP address of the second database instance container to the second pool of the second plurality of IP addresses of the second host server.

Returning to FIG. 5, in some embodiments, allocation module 544 of orchestration system 340 is configured to automatically deallocate an IP address of a host server to a database instance container. In other embodiments, any other modules 532, 534, 542, 544, 552 of system 300 can automatically deallocate the IP address from the pool of IP addresses of the host server to a database instance container.

Method 400 in FIG. 4 can further comprise an activity of selecting one host server of the first host server or the second host server for binding of at least one additional database instance container to an IP address of the one of the first host server or the second host server based upon at least one of the one or more of (a) resource availability of the first host server relative to the second host server or (b) a number of database instance containers already bound to the first host server relative to the second host server. In some embodiments, selecting a host server for binding of a database instance container is determined by a set of rules and/or an algorithm. Turning to FIG. 5, in some embodiments, orchestration module 542 of orchestration system 340 comprises information about all the switches in the network and is configured to obtain port number/mac address information of all of the switches in the network. In a container configuration, a particular IP address of the host server can be defined to be assigned or allocated to a database container instance. Before assigning or allocating the IP address to the database instance container, the orchestration system 340 can determine which host server has capacity to run that database instance container. The orchestration system 340 can then log into the switch where one of the physical NICs is coupled, configure the VLAN on that switch port, and start container binding the VLAN to the NIC with the IP provided. Thus, no virtual network layer is utilized.

Returning to FIG. 4, method 400 can further comprise an activity 465 of determining if a host server has sufficient space to create a redundant array of independent discs (RAID). More particularly, a method can comprise specifying an amount of storage space required for an additional database instance container and determining which one host server of the first host server and the second host server has sufficient space to create a RAID volume.

Method 400 can further comprise an activity 470 deploying an additional database container. For example, upon determining which host server has sufficient space to create a RAID volume, a method can comprise deploying an additional database instance container to the one host server of the first host server or the second host server determined to have sufficient space to create the RAID volume. In more particular embodiments, deploying an additional database container can comprise deploying an additional database instance container to a cluster if utilization of the cluster exceeds a defined threshold. For example, deploying an additional database cluster can comprise deploying a first additional database instance container to the first cluster if utilization of the first cluster exceeds a defined threshold, and deploying a second additional database instance container to the second cluster if utilization of the second cluster exceeds the defined threshold. Reviewing FIG. 5, in some embodiments, deployment module 512 of the deployment system 310 is configured to deploy an additional database container. In other embodiments, any other modules 532, 534, 542, 544, 552 of system 300 can be configured to deploy an additional database container. While these deployments of database instance containers are described with respect to additional database instance containers, it also is contemplated that similar activities can be performed for deployment of any database instance containers, including but not limited to a first database instance container deployed to or otherwise created at a first host server.

Method 400 in FIG. 4 can further comprise an activity 470 of eliminating an additional database instance container. Eliminating an additional database instance container can comprise eliminating the additional database instance if utilization of the cluster to which the database instance container belongs falls below a defined threshold. For example, a method can comprise eliminating a first additional database instance container from a first cluster if utilization of the first cluster falls below the defined threshold, and/or eliminating a second additional database instance container from a second cluster if utilization of the second cluster falls below the defined threshold. Returning to FIG. 5, in some embodiments, deployment module 512 of the deployment system 310 is configured to eliminate an additional database container. In other embodiments, any other modules 532, 534, 542, 544, 552 of system 300 can be configured to eliminate an additional database container. While these embodiments are described with respect to additional database instance containers, it also is contemplated that similar activities can be performed for deployment of any database instance containers, including but not limited to a first database instance container deployed to or otherwise created at a first host server.

FIG. 5 illustrates a block diagram of a portion of system 300 comprising deployment 310, container level system 330, orchestration system 340, and display system 350 according to the embodiment shown in FIG. 3. Each of deployment 310, container level system 330, orchestration system 340, and/or display system 350 is merely exemplary and not limited to the embodiments presented herein. Each of deployment 310, container level system 330, orchestration system 340, and/or display system 350 can be employed in many different embodiments or examples not specifically depicted or described herein. In some embodiments, certain elements or modules of deployment 310, container level system 330, orchestration system 340, and/or display system 350 can perform various procedures, processes, and/or acts. In other embodiments, the procedures, processes, and/or acts can be performed by other suitable elements or modules.

In many embodiments deployment system 310 can comprise a non-transitory storage module such as module 512, container level system 330 can comprise non-transitory storage modules such as modules 532, 534, orchestration system 340 can comprise non-transitory storage modules such as modules 542, 544, and display system 350 can comprise a non-transitory storage module such as module 552. Module 512 can be referred to as deployment module 512, module 532 can be referred to as CPU module 532, module 534 can be referred to as memory module 534, module 542 can be referred to as orchestration module 542, module 544 can be referred to as allocation module 544, and module 552 can be referred to as display module 552.

In many embodiments, deployment module 512 can store computing instructions configured to run on one or more processing modules and perform one or more acts of method 400 (FIG. 4) (e.g. activity 420 of receiving a request from an input device to deploy a database instance container at the host server, activity 425 of transmitting an instruction from an output device to deploy the database instance container at the host server, activity 430 of creating a database instance container at the host server, and activity 435 of binding the database instance container to the bonded network interface and also an IP address from the pool of IP addresses of the host server). In some embodiments, CPU module 532 can store computing instructions configured to run on one or more processing modules and perform one or more acts of a method (e.g. an activity of guaranteeing and/or limiting an amount of CPU of the system allocated to each database instance container). In some embodiments, memory module 534 can store computing instructions configured to run on one or more processing modules and perform one or more acts of a method (e.g. an activity of guaranteeing and/or limiting an amount of memory of the system allocated to each database instance container). In some embodiments, orchestration module 542 can store computing instructions configured to run on one or more processing modules and perform one or more acts of method 400 (FIG. 4) (e.g. activity 440 of mapping a persistent file system and activity 445 storing data of the database instance container outside the database instance container and in the persistent file system). In some embodiments, allocation module 544 can store computing instructions configured to run on one or more processing modules and perform one or more acts of a method (e.g. allocating and deallocating an IP address of a host server to a database instance container). In some embodiments, display module 552 can store computing instructions configured to run on one or more processing modules and perform one or more acts of method 400 (FIG. 4) (e.g. activity 450 of facilitating a display on a device of the host server at which the database instance container has been deployed).

In some embodiments, orchestration system can comprise a VLAN orchestration module. The VLAN orchestration module, or any other modules 512, 532, 534, 542, 544, 552, can be configured to configure VLANs on the switch to which the host servers are coupled. The VLAN orchestration module can be configured to automatically detect a fleet of switches coupled to a cluster and, based on the requirement, configure switch ports of the VLAN depending upon which database instance container is going to run on the bare metal host coupled to that switch port.

Various embodiments described herein allow a user to deploy multiple database instance containers to optimally leverage system resources, which results in reducing the overall hardware procurement costs, extending the available capacity of the system, and lowering of the effective license costs. Some embodiments provide the efficiency of a bare metal system while simultaneously avoiding the inefficiency of virtualized system caused by resource virtualization layers. For example, some embodiments described herein are devoid of a virtualization layers between the host server and the database instance container.

To illustrate the efficiency of the contemplated embodiments, performance tests were completed. The performance test environment included a production cluster on bare metal and a database instance container cluster (using production hardware). The test was performed by an application "e-Receipts". All clusters were created with four nodes in each of two datacenters for a total of eight nodes. Cassandra applications were utilized across the test environments, and the configurations/setup of the Cassandra applications was similar across the test environments. A test load was continuously executed from four application instances, two from each data center, accessing the local datacenter nodes. Each application instance wrote/read 1,000,000 rows. Table 1 provides a summary of a test environment configuration of the performance test.

TABLE 1

| Hardware Resources | Bare Metal | Database Instance Containers |
|---|---|---|
| CPU | 32 Cores | 16 Cores |
| Memory | 190 GB | 80 GB |
| Disk | 6 TB (14 SSDs-JBOD) | 6 TB (single RAID0 volume) |
| Disk Throughput Test | | |
| Write | 1.2 GB/s | 1.3 GB/s |
| Read | 4.3 GB/s | 4.4 GB/s |

Table 2 provides a number comparison of the performance test of the e-Receipts application on the bare metal and database instance containers systems. The asterisk in Table 2 notes that a difference in I/O throughput was caused by the different storage RAID configurations. The results of the performance testing indicate that the database instance container solution performs similar to bare metal systems.

TABLE 2

| Comparison (+/−3% Margin of Error) | Bare Metal | Database Instance Containers |
|---|---|---|
| Reads | | |
| Per Second | 4615.72 | 6778.57 |
| Average Latency (in milliseconds (ms)) | 1.49 | 0.60 |
| Writes | | |
| Per Second | 8332.02 | 8333.33 |
| Average Latency (in ms) | 0.72* | 0.46* |

Although database instance container deployment has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform operations comprising:
providing a bonded network interface on a host server, the host server comprising a plurality of internet protocol (IP) addresses;
binding a first database instance container to a first IP address of the plurality of IP addresses of the host server, wherein the first database instance container belongs to a first cluster, and wherein binding the first database instance container to the first IP address further comprises accessing a switch comprising a port coupled to a network interface controller of a first plurality of network interface controllers in the host server; and
binding a second database instance container to a second IP address of the plurality of IP addresses of the host server, wherein:
the second database instance container belongs to a second cluster that is different from and non-overlapping with the first cluster;
the first cluster has a different fault tolerance than the second cluster;
a first database deployed inside the first database instance container has direct access to the host server;
a second database deployed inside the second database instance container has direct access to the host server; and
binding the first database instance container to the first IP address further comprises binding the first database instance container to the first IP address without a virtual network layer.

2. The system of claim 1, wherein the operations further comprise:
storing application data of the first database instance container in a first persistent file system and outside the first database instance container;
storing application data of a third database instance container in the first persistent file system and outside the third database instance container;
storing application data of the second database instance container in a second persistent file system and outside the second database instance container; and
storing application data of a fourth database instance container in the second persistent file system and outside the fourth database instance container.

3. The system of claim 1, wherein the operations further comprise:
automatically allocating and deallocating the first IP address to the first database instance container;
automatically allocating and deallocating the second IP address to the second database instance container;
automatically allocating and deallocating a third IP address of a first host server to a third database instance container; and
automatically allocating and deallocating a fourth IP address of a second host server to a fourth database instance container.

4. The system of claim 1, wherein the operations further comprise:
deploying an additional database instance container to the first cluster when utilization of the first cluster exceeds a defined threshold;
deploying the additional database instance container to the second cluster when utilization of the second cluster exceeds the defined threshold;
eliminating the additional database instance container from the first cluster when utilization of the first cluster falls below the defined threshold; and
eliminating the additional database instance container from the second cluster when utilization of the second cluster falls below the defined threshold.

5. The system of claim 1, wherein the operations further comprise:
aggregating the first plurality of network interface controllers available in a first host server to create a first bonded network interface in a first active-active mode; and
aggregating a second plurality of network interface controllers available in a second host server to create a second bonded network interface in a second active-active mode, wherein the host server comprises the first host server and the second host server;
limiting one or more amounts of a central processing unit (CPU) of the system allocated to one or more of the first database instance container, the second database instance container, a third database instance container, or a fourth database instance container;
guaranteeing one or more amounts of the CPU of the system allocated to one or more of the first database instance container, the second database instance container, the third database instance container, or the fourth database instance container;
limiting one or more amounts of memory of the system allocated to one or more of the first database instance container, the second database instance container, the third database instance container, or the fourth database instance container; and
guaranteeing one or more amounts of the memory of the system allocated to one or more of the first database instance container, the second database instance container, the third database instance container, or the fourth database instance container.

6. The system of claim 1, wherein the operations further comprise:
receiving a first request from an input device to deploy one or more of the first database instance container or a third database instance container at a first host server;
receiving a second request from the input device to deploy one or more of the second database instance container or a fourth database instance container at a second host server, wherein the host server comprises the first host server and the second host server;
transmitting a first instruction from an output device to deploy the one or more of the first database instance container or the third database instance container at the first host server responsive to the first request from the input device to deploy the one or more of the first database instance container or the third database instance container at the first host server;
transmitting a second instruction from the output device to deploy the one or more of the second database instance container or the fourth database instance container at the second host server responsive to the second request from the input device to deploy the one or more of the second database instance container or the fourth database instance container on the second host server;
facilitating displaying on a device of the first host server at which the one or more of the first database instance container or the third database instance container has been deployed; and
facilitating displaying on a device of the second host server at which the one or more of the second database instance container or the fourth database instance container has been deployed.

7. The system of claim 1, wherein:
providing the bonded network interface on the host server further comprises:
providing a first bonded network interface at a first host server to create a first bonded network interface in a first active-active mode by aggregating the first plurality of network interface controllers available in the first host server; and
creating a second bonded network interface at a second host server to create the second bonded network interface in a second active-active mode by aggregating a second plurality of network interface controllers available in the second host server, wherein the host server comprises the first host server and the second host server; and
the operations further comprise:
creating the first database instance container at the first host server by using one IP address from a first pool of a first plurality of IP addresses of the first host server to create the first IP address on the first bonded network interface at the first host server;
creating the second database instance container at the second host server by using one IP address from a second pool of a second plurality of IP addresses of the second host server to create the second IP address on the second bonded network interface at the second host server;
eliminating at least one of the first database instance container or the second database instance container;
when the first database instance container is eliminated, returning the first IP address of the first database instance container to the first pool of the first plurality of IP addresses of the first host server; and
when the second database instance container is eliminated, returning the second IP address of the second database instance container to the second pool of the second plurality of IP addresses of the second host server.

8. The system of claim 1, wherein the operations further comprise:
mapping a first persistent file system of a first host server to a predetermined first host level volume;
mapping a second persistent file system of a second host server to a predetermined second host level volume, wherein the host server comprises the first host server and the second host server;
storing data for the first database instance container outside the first database instance container and in the first persistent file system;
storing data for the second database instance container outside the second database instance container and in the second persistent file system;
binding a third database instance container of the first cluster to a first bonded network interface and also to a third IP address of a first pool of a first plurality of IP addresses of the first host server such that a third database deployed inside the third database instance container has direct access to the first host server; and
binding a fourth database instance container of the second cluster to a second bonded network interface and also to a fourth IP address of a second pool of a second plurality of IP addresses of the second host server such that a fourth database deployed inside the fourth database instance container has direct access to the second host server.

9. The system of claim 1, wherein the operations further comprise:
selecting one of a first host server or a second host server for binding of at least one additional database instance container to (i) an IP address of the first host server or (ii) an IP address of the second host server based upon at least one of one or more of:
resource availability of the first host server relative to the second host server; or
a number of database instance containers already bound to the first host server relative to the second host server, wherein the host server comprises the first host server and the second host server;
when utilization of the first cluster exceeds a defined threshold, deploying a first additional database instance container to the first cluster;
when utilization of the second cluster exceeds the defined threshold, deploying a second additional database instance container to the second cluster;
when utilization of the first cluster falls below the defined threshold, eliminating a database instance container from the first cluster;
when utilization of the second cluster falls below the defined threshold, eliminating a database instance container from the second cluster;
specifying an amount of storage space required for an additional database instance container;
determining which one of the first host server or the second host server has sufficient space to create a redundant array of independent discs (RAID) volume;
deploying the additional database instance container to the one of the first host server or the second host server determined to have sufficient space to create the RAID volume; and
before binding the first database instance container and also before binding the second database instance container, receiving one or more requests from an electronic device to:
bind the first database instance container;
bind the second database instance container; or
set the different fault tolerance for the first cluster and the second cluster.

10. A method being implemented via execution of computing instructions configured to run on one or more processors and stored at one or more non-transitory computer-readable media, the method comprising: providing a bonded network interface on a host server, the host server comprising a plurality of internet protocol (IP) addresses;
binding a first database instance container to a first IP address of the plurality of IP addresses of the host server, wherein the first database instance container belongs to a first cluster, and wherein binding the first database instance container to the first IP address further comprises accessing a switch comprising a port coupled to a network interface controller of a first plurality of network interface controllers in the host server; and binding a second database instance container to a second IP address of the plurality of IP addresses of the host server, wherein:
- the second database instance container belongs to a second cluster that is different from and non-overlapping with the first cluster;
- the first cluster has a different fault tolerance than the second cluster;
- a first database deployed inside the first database instance container has direct access to the host server;
- a second database deployed inside the second database instance container has direct access to the host server; and
- binding the first database instance container to the first IP address further comprises binding the first database instance container to the first IP address without a virtual network layer.

11. The method of claim 10, further comprising:
storing application data of the first database instance container in a first persistent file system and outside the first database instance container;
storing application data of a third database instance container in the first persistent file system and outside the third database instance container;
storing application data of the second database instance container in a second persistent file system and outside the second database instance container; and
storing application data of a fourth database instance container in the second persistent file system and outside the fourth database instance container.

12. The method of claim 10, further comprising:
automatically allocating and deallocating the first IP address to the first database instance container;
automatically allocating and deallocating the second IP address to the second database instance container;
automatically allocating and deallocating a third IP address of a first host server to a third database instance container; and
automatically allocating and deallocating a fourth IP address of a second host server to a fourth database instance container.

13. The method of claim 10, further comprising:
deploying an additional database instance container to the first cluster when utilization of the first cluster exceeds a defined threshold;
deploying the additional database instance container to the second cluster when utilization of the second cluster exceeds the defined threshold;
eliminating the additional database instance container from the first cluster when utilization of the first cluster falls below the defined threshold; and
eliminating the additional database instance container from the second cluster when utilization of the second cluster falls below the defined threshold.

14. The method of claim 10, further comprising:
aggregating the first plurality of network interface controllers available in a first host server to create a first bonded network interface in a first active-active mode; and aggregating a second plurality of network interface controllers available in a second host server to create a second bonded network interface in a second active-active mode, wherein the host server comprises the first host server and the second host server;
limiting one or more amounts of a central processing unit (CPU) of a system allocated to one or more of the first database instance container, the second database instance container, a third database instance container, or a fourth database instance container;
guaranteeing one or more amounts of the CPU of the system allocated to one or more of the first database instance container, the second database instance container, the third database instance container, or the fourth database instance container;
limiting one or more amounts of memory of the system allocated to one or more of the first database instance container, the second database instance container, the third database instance container, or the fourth database instance container; and
guaranteeing one or more amounts of the memory of the system allocated to one or more of the first database instance container, the second database instance container, the third database instance container, or the fourth database instance container.

15. The method of claim 10, further comprising:
receiving a first request from an input device to deploy one or more of the first database instance container or a third database instance container at a first host server;
receiving a second request from the input device to deploy one or more of the second database instance container or a fourth database instance container at a second host server, wherein the host server comprises the first host server and the second host server;
transmitting a first instruction from an output device to deploy the one or more of the first database instance container or the third database instance container at the first host server responsive to the first request from the input device to deploy the one or more of the first database instance container or the third database instance container at the first host server;
transmitting a second instruction from the output device to deploy the one or more of the second database instance container or the fourth database instance container at the second host server responsive to the second request from the input device to deploy the one or more of the second database instance container or the fourth database instance container on the second host server;
facilitating displaying on a device of the first host server at which the one or more of the first database instance container or the third database instance container has been deployed; and
facilitating displaying on a device of the second host server at which the one or more of the second database instance container or the fourth database instance container has been deployed.

16. The method of claim 10, wherein:
providing the bonded network interface on the host server further comprises:
providing a first bonded network interface at a first host server to create a first bonded network interface in a first active-active mode by aggregating the first plurality of network interface controllers available in the first host server; and
creating a second bonded network interface at a second host server to create the second bonded network interface in a second active-active mode by aggregating a second plurality of network interface controllers available in the second host server, wherein the host server comprises the first host server and the second host server; and;

further comprising:
creating the first database instance container at the first host server by using one IP address from a first pool of a first plurality of IP addresses of the first host server to create the first IP address on the first bonded network interface at the first host server;
creating the second database instance container at the second host server by using one IP address from a second pool of a second plurality of IP addresses of the second host server to create the second IP address on the second bonded network interface at the second host server;
eliminating at least one of the first database instance container or the second database instance container;
when the first database instance container is eliminated, returning the first IP address of the first database instance container to the first pool of the first plurality of IP addresses of the first host server; and
when the second database instance container is eliminated, returning the second IP address of the second database instance container to the second pool of the second plurality of IP addresses of the second host server.

17. The method of claim 10, further comprising:
mapping a first persistent file system of a first host server to a predetermined first host level volume;
mapping a second persistent file system of a second host server to a predetermined second host level volume, wherein the host server comprises the first host server and the second host server;
storing data for the first database instance container outside the first database instance container and in the first persistent file system;
storing data for the second database instance container outside the second database instance container and in the second persistent file system;
binding a third database instance container of the first cluster to a first bonded network interface and also to a third IP address of a first pool of a first plurality of IP addresses of the first host server such that a third database deployed inside the third database instance container has direct access to the first host server; and
binding a fourth database instance container of the second cluster to a second bonded network interface and also to a fourth IP address of a second pool of a second plurality of IP addresses of the second host server such that a fourth database deployed inside the fourth database instance container has direct access to the second host server.

18. The method of claim 10, further comprising:
selecting one of a first host server or a second host server for binding of at least one additional database instance container to (i) an IP address of the first host server or (ii) an IP address of the second host server based upon at least one of one or more of:
resource availability of the first host server relative to the second host server, or
a number of database instance containers already bound to the first host server relative to the second host server, wherein the host server comprises the first host server and the second host server;
when utilization of the first cluster exceeds a defined threshold, deploying a first additional database instance container to the first cluster;
when utilization of the second cluster exceeds the defined threshold, deploying a second additional database instance container to the second cluster;
when utilization of the first cluster falls below the defined threshold, eliminating a database instance container from the first cluster;
when utilization of the second cluster falls below the defined threshold, eliminating a database instance container from the second cluster;
specifying an amount of storage space required for an additional database instance container;
determining which one of the first host server or the second host server has sufficient space to create a redundant array of independent discs (RAID) volume;
deploying the additional database instance container to the one of the first host server or the second host server determined to have sufficient space to create the RAID volume; and
before binding the first database instance container and also before binding the second database instance container, receiving one or more requests from an electronic device to:
bind the first database instance container;
bind the second database instance container; or
set the different fault tolerance for the first cluster and the second cluster.

19. A non-transitory computer-readable medium storing instructions, wherein the instructions, upon execution by a processor, cause the processor to perform operations comprising:
providing a bonded network interface on a host server, the host server comprising a plurality of internet protocol (IP) addresses;
binding a first database instance container to a first IP address of the plurality of IP addresses of the host server, wherein the first database instance container belongs to a first cluster, and wherein binding the first database instance container to the first IP address further comprises accessing a switch comprising a port coupled to a network interface controller of a first plurality of network interface controllers in the host server; and
binding a second database instance container to a second IP address of the plurality of IP addresses of the host server, wherein:
the second database instance container belongs to a second cluster that is different from and non-overlapping with the first cluster;
the first cluster has a different fault tolerance than the second cluster;
a first database deployed inside the first database instance container has direct access to the host server;
a second database deployed inside the second database instance container has direct access to the host server; and
binding the first database instance container to the first IP address further comprises binding the first database instance container to the first IP address without a virtual network layer.

20. The non-transitory computer-readable medium of claim 19, wherein the operations further comprise:

storing application data of the first database instance container in a first persistent file system and outside the first database instance container;
storing application data of a third database instance container in the first persistent file system and outside the third database instance container;
storing application data of the second database instance container in a second persistent file system and outside the second database instance container; and
storing application data of a fourth database instance container in the second persistent file system and outside the fourth database instance container.

* * * * *